US007005034B1

(12) United States Patent
Moberg et al.

(10) Patent No.: US 7,005,034 B1
(45) Date of Patent: Feb. 28, 2006

(54) METHOD IN CONNECTION WITH THE PRODUCTION OF MECHANICAL PULP

(76) Inventors: Anders Moberg, Lagmansvägen 2, SE-663 41, Hammarö (SE); Frank Peng, Lagmansvägen 12, SE-663 41, Hammarö (SE); Mats Fredlund, Edebäcksgatan 43A, SE-654 61, Karlstad (SE)

( * ) Notice: Subject to any disclaimer, the term of this patent is extended or adjusted under 35 U.S.C. 154(b) by 328 days.

(21) Appl. No.: 10/070,806

(22) PCT Filed: Sep. 6, 2000

(86) PCT No.: PCT/SE00/01709

§ 371 (c)(1),
(2), (4) Date: Apr. 9, 2002

(87) PCT Pub. No.: WO01/20074

PCT Pub. Date: Mar. 22, 2001

(30) Foreign Application Priority Data

Sep. 10, 1999 (SE) .................................... 9903215

(51) Int. Cl.
*D21B 1/04* (2006.01)
*D21C 3/26* (2006.01)

(52) U.S. Cl. .......................... 162/28; 162/55; 162/57; 162/78; 162/20; 162/24; 162/25; 162/26; 162/47

(58) Field of Classification Search ................. 162/55, 162/78, 57, 20, 24, 25, 26, 28, 47
See application file for complete search history.

(56) References Cited

U.S. PATENT DOCUMENTS

| 3,411,720 | A | * | 11/1968 | Jones et al. | .................... 241/28 |
| 3,441,130 | A |   | 4/1969  | Sisson et al. | |
| 4,292,122 | A | * | 9/1981  | Karnis et al. | .................. 162/28 |
| 4,731,160 | A | * | 3/1988  | Prough et al. | ................. 162/55 |
| 4,776,926 | A | * | 10/1988 | Lindahl | ........................ 162/28 |
| 5,118,389 | A | * | 6/1992  | Dubelsten et al. | ............ 162/19 |
| 5,853,534 | A | * | 12/1998 | Hoglund et al. | ............... 162/23 |

* cited by examiner

*Primary Examiner*—Mark Halpern
(74) *Attorney, Agent, or Firm*—Nixon & Vanderhye

(57) ABSTRACT

A method in connection with the production of mechanical pulp from a cellulose containing material wherein the material is processed in at least one refining step to produce pulp. According to the invention, the pulp is fractionated (4), after a first refining step (1), in order to separate primary fines (5) from the pulp. The invention also relates to a mechanical pulp, produced by the method, and to a paperboard, which at least partly consists of such mechanical pulp.

18 Claims, 8 Drawing Sheets

METHOD IN CONNECTION WITH THE PRODUCTION OF MECHANICAL PULP

This application is a 371 of PCT/SE00/01709 filed on 6 Sep. 2000.

TECHNICAL FIELD

The present invention relates to a method in connection with the production of mechanical pulp from a cellulose containing material, wherein the material is processed in at least one refining step to produce pulp. The invention also relates to a mechanical pulp, produced by the method, and a paperboard, at least partly consisting of such mechanical pulp.

BACKGROUND OF THE INVENTION

Mechanical pulp, most often CTMP (Chemi Thermo Mechanical Pulp), is a major component in multiply board constructions, and often constitutes about 70% of the centre layer and up to 50% of the board furnish.

To achieve high bending stiffness of the board it is desirable to have a high strength at a sheet density of the centre ply as low as possible. A favourable Scott bond-density relationship is thus essential. To this end, there are two opposing aspects that have to be considered. Firstly, only the components of the raw material which contribute to strength and bulk are desirable to have in the refined pulp. The other components, which do not contribute to strength and bulk in any extent, basically constitutes a load in the system, and require additional drying capacity, bleaching agent consumption, etc. On the other hand, every component that remain in the pulp will contribute to a high yield in the production. One of the aspects that renders mechanical pulp competitive in relation to chemical pulp, is the higher yield of mechanical pulp.

Another important aspect of the mechanical pulp is the taint and odour properties, which are directly related to the extractives and manganese left in the pulp. The taint and odour properties are especially important when the pulp is to be used in paperboard for food or liquid related applications. This is true for all types of mechanical pulp. For TMP (Thermo Mechanical Pulp), the taint and odour problem is so serious that this type of pulp is not used in paperboard today. If the pulp is to be bleached with non-chlorine bleaching agents, especially peroxide containing bleaching agents, the remaining manganese content in the pulp constitutes a problem, which results in a higher consumption of bleaching agents and an increased need for complexing agents, such as EDTA or DTPA, in order to reach a desired brightness level. Also, a remaining extractives content in the pulp results in a high washing demand, and increased contamination of the water system and the effluents from the mill.

It has been shown in laboratory studies for bleached kraft pulps that primary fines have detrimental effects on the bleachability of the pulp, "Bäckström, M., Htun M.: Improved Bleachability Without Primary Fines, 1998 International Pulp Bleaching Conference, Proceedings Book 2, pp 333–336". Similar results on the bleachability of kraft pulp have been reported in a study on the effects of ray cells, "Westermark, U., Capretti, G.: Influence of Ray Cells on The Bleachability and Properties of CTMP and Kraft Pulps, Nordic Pulp & Paper Res. J. 3(1988) 2, pp 95–99". In the latter reference, the effect of ray cells in mechanical pulps has also been studied. It was concluded that no significant difference in bleachability for CTMP pulp with and without ray cells, respectively, could be detected. As to the contribution of ray cells on strength and bonding properties of CTMP and TNT pulp, it was concluded that an addition to the pulp of a ray cell fraction, resulted in poor bonding and strength properties.

In "Rydholm, S. A.: Pulping Processes, Interscience, New York (1965), p 744", it has been suggested to use specially designed so called ray cell filters for the separation of resin containing ray cells in the sulphite pulp industry.

For mechanical pulps however, no industrial process has been designated to address the problems related to primary fines, which problems are specific for mechanical pulps, i.e. problems with taint, odour, strength and bulk. Neither has a coarse pulp fraction, free from primary fines, been treated to attain improved pulp properties for the production of paper or paperboard.

DESCRIPTION OF THE INVENTION

It is an object of the present invention to provide a method in connection with the production of mechanical pulp, which will yield a pulp having a low density, i.e. a high bulk, and still good strength properties, especially measured in the z-direction, e.g. as Scott bond, and which in the same time is low in extractives and manganese content.

To this end, there is presented a method according to claim 1. Thus, the object of the invention is attained by fractionating the pulp, after a first refining step, in order to separate primary fines from the pulp.

In the development of pulp strength, fines material is produced and contributes to bonding of fibres and consolidation of the paper sheet. The primary fines, mainly consisting of middle lamella fragments and materials originated from the parenchyma cells, contain high amounts of lignin and extractives. Generally the primary fines are defined as fines produced in the first refining step, in the production of mechanical pulp. They have a size of <200 mesh according to Bauer McNett. Primary fines contribute less to pulp strength compared to secondary fines which are produced from the secondary fibre wall as fibrils in the latter stages of the refining process, i.e. the post refining. The secondary fines have about the same size as the primary fines, but are, as just stated, produced in connection with the post refining. The contents of DCM extractives and transition metals in the primary fines are several times higher than in the whole pulp.

By fractionating the pulp after the first refining step, the primary fines, which accordingly contribute very little to strength and bulk, and contain relatively large amounts of extractives and manganese, can be separated from the pulp. The pulp is subsequently exposed to post refining, in a second refining step with or without reject screening, whereby strength contributing secondary fines are produced in the pulp. It should be clarified that in this context, a first refining step is defined as a refining step which yields primary fines, mainly consisting of middle lamella fragments and materials originated from the parenchyma cells, containing high amounts of lignin and extractives. This would mean that also two physically differing refining steps in series, which are operated to yield primary fines, would be considered as being one first refining step.

According to one aspect of the invention, the first refining step is adapted to achieve a high freeness in the pulp, preferably at least 500 ml CSF, and even more preferred 600–800 ml CSF, and to yield a primary fines content of 3–15%, preferably 5–10%, in the pulp. Preferably, the fractionation is effected by screening in any type of suitable screen, preferably in at least one curved screen. It could also be conceived to centrifuge the pulp, preferably in at least one cyclone. The fractionation may also be performed in at least two steps. Suitably, the pulp is diluted, to about 1–4% dry solids, preferably 1–2% before the fractionation.

According to another aspect of the invention, 3–15%, preferably 5–10% of said pulp, measured as dry weight, is separated from the pulp in the fractionation. The extent to which primary fines are separated from the pulp, depends on the desired end product. The primary fines, which are separated accordingly, are led away from said pulp production.

According to yet another aspect of the invention, the pulp is subjected to a treatment step after said first refining step, but before said fractionation, in which treatment step the pulp is subjected to one or more of the treatments including dilution, temperature enhancement, and mechanical agitation in a certain retention time. This may be performed in a so called latency chest or any type of retention vessel. Basically, the object of such a treatment step is to allow the fibres to straighten up after the first refining step.

After the refining and fractionation steps, the pulp may be subjected to bleaching, preferably peroxide bleaching. All types of peroxide containing bleaching agents may be used, but hydrogen peroxide is especially preferred.

The cellulose containing raw material for the process may be either any type of wood species, such as hardwood or softwood, or any type of non-wood species, e.g. bagasse, straw etc. The type of process used for the production of mechanical pulp may be CTMP, CMP, TMP or HTCTMP (High Temperature CTMP). The mechanical pulp, which is produced in the method, is preferably used in the production of paperboard, most preferably paperboard intended for food and liquid related applications, such as food or liquid containers, etc.

The invention also relates to mechanical pulp from a cellulose containing material, which pulp is produced by the method, and to paperboard, at least partly produced from such mechanical pulp.

By the method, there may be attained a bulk which is at least 5%, and up to 20%, preferably 10–15%, higher than a reference pulp, which has not been exposed to fractionation, at a given strength. At the same time, the extractives and manganese content may be lowered with about 50% in relation to the reference pulp. Consequently, the taint and odour properties of the pulp, measured as hexanal level after 10–30 days, is lowered with up to 80–90%. For TMP pulp, the reduction in extractives, and consequently in hexanal level is especially interesting, creating a possibility to use TMP pulp in applications, such as food and liquid related paperboard, where it has not been possible to use it before, due to its poor taint and odour properties.

As a consequence of the higher bulk at a given strength, the basis weight of board can be reduced due to less required pulp in the centre ply. The higher bulk balances, to a certain degree, the yield loss that the removal of primary fines will give. The yield loss may also be kept on a low level with a more selective fractionation, if the first refining step is operated to yield less fines.

The environmental aspect of a system according to the invention can be addressed in two ways. Firstly, the water system will become cleaner due to the removal of primary fines that contains large amount of extractives at an early stage of the process. At the same time the washing demand is reduced. This results in less and cleaner effluent from the pulp mill. Secondary, the demand of chelating/complexing agent (EDTA or DTPA) will be expectedly lower, both in washing and in bleaching, due to the lower manganese content remaining in the fractionated pulp. This reduces the impact of chelating agent on the environment.

On the other hand, the environmental benefits can be realised only if the primary fines containing water flow is handled properly. A technically feasible way is to thicken the fines material, with commercially available equipment. The thickened fines may be sent back to the existing energy recovery system for heat generation, or be used for cattle-food or in another line for pulp, paper or paperboard production, or be disposed of as solid waste.

The chemical savings from primary fines removal are substantial. The DTPA charge, usually 2–2.5 kg/t, could be cut by up to 50%, i.e. to 1–1.3 kg/t, calculated on the chelating need in both washing and bleaching. Also, a lower consumption of peroxide and caustic is required at the same brightness. The brightness maximum without DTPA will also be much higher for the primary fines fractionated pulp, which is interesting in case there will come legislative restrictions for the use of chelating agents in the future.

BRIEF DESCRIPTION OF THE FIGURES

In the following, the invention and an example, will be described, referring to the figures, of which.

DESCRIPTION OF THE DRAWINGS

Figure 1:
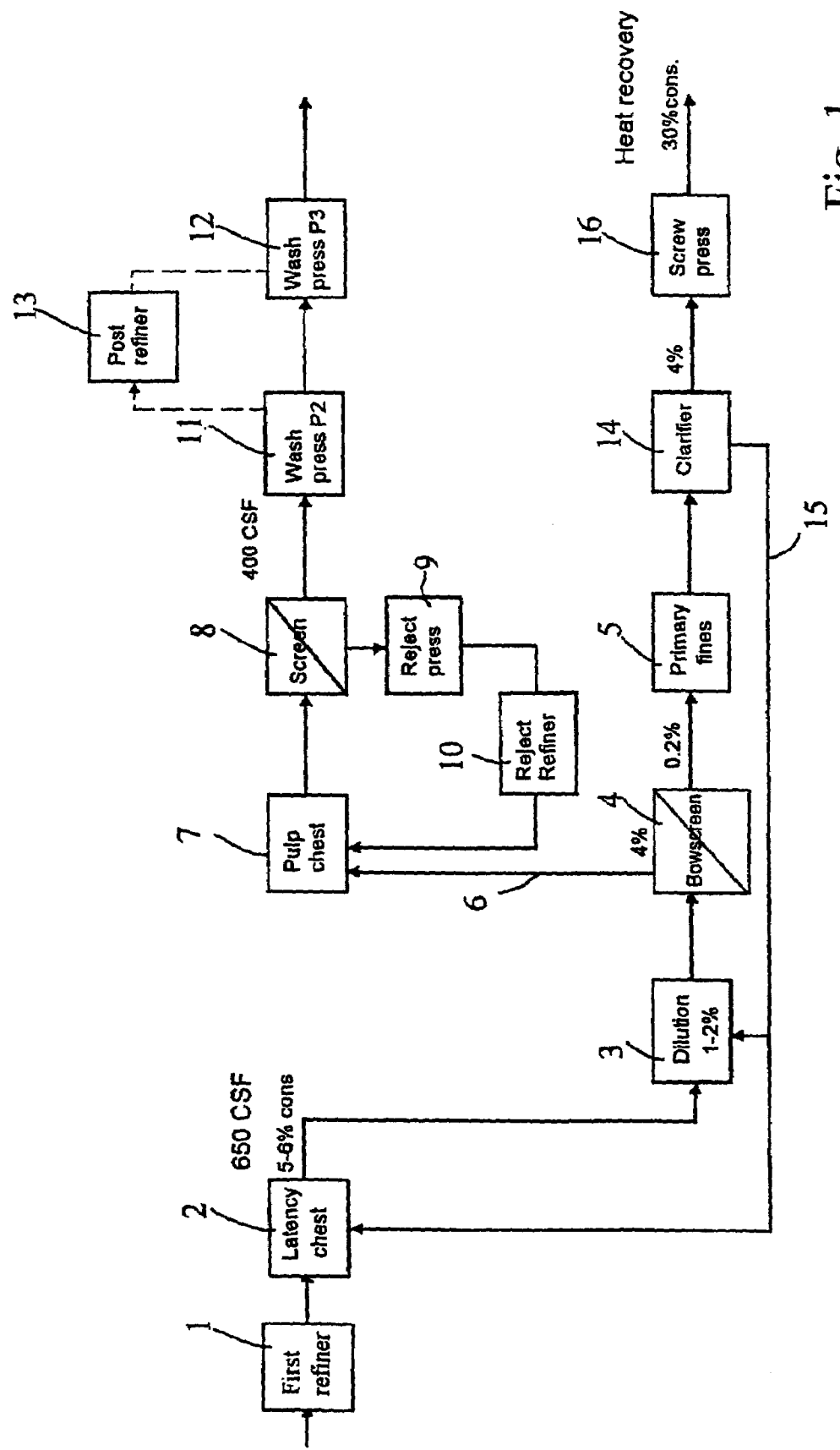
FIG. 1 is showing a flow scheme of a preferred embodiment of the invention.

The method according to the invention is described in connection with FIG. 1. Before refining, the cellulose containing raw material is possibly pretreated in a conventional way, depending on the type of pulp which is being produced, i.e. with heat and/or chemicals. Thereafter, the raw material is subjected to a first refining step, in the first (primary) refiner 1. The first refining step is operated to yield a high freeness, about 650 ml CSF, in the pulp which is produced. In a subsequent treatment step 2, in a so called latency chest, the fibres are allowed to straighten up during a certain retention time, and under influence of dilution, heating and mechanical agitation. The pulp leaving the treatment step 2 has a consistency of about 5–6% and is further diluted 3 to about 1–2%, before being subjected to fractionation 4.

In the fractionation step 4, up to 15% of the pulp fibres are separated from the pulp stream as primary fines 5, i.e. the fraction <200 mesh according to Bauer McNett. In the preferred embodiment there is used one or more curved screens in the fractionation step. The remaining part 6 of the pulp, having a consistency of about 4%, is led on in the process, as is conventional, through a pulp chest 7 and further to a screening step 8 for separation of coarse material. The reject in the screening 8 of coarse material is thickened in a press 9 and subjected to a refining step in a reject refiner 10 which also functions as a second refining step, and is subsequently recirculated back to the pulp stream, upflow the screening 8 of coarse material. The accept in the screening 8 of coarse material is dewatered and washed in one or more wash presses 11, 12, to a consistency of about 20–30%. An additional refining step 13, or post refining, can also be performed, preferably between the wash presses 11 and 12. Both secondary refining and post refining can be performed at HC (high consistency) or MC (medium consistency) or LC (low consistency), and with different types of refining equipments, for instance disk refiner or conical refiner. The second refining step and optional post refining is operated to yield secondary fines, which contribute to the strength of the pulp.

After the final wash step 11, 12, the pulp is preferably subjected to bleaching, preferably non-chlorine bleaching and most preferably peroxide bleaching, with or without the addition of a chelating/complexing agent, such as DTPA or EDTA.

The primary fines 5, which are separated in the fractionation step 4, having a consistency of about 0,1–1%, are being dewatered/clarified 14, the filtrate 15 being returned to the process, preferably to the dilution step 3 upflow the fractionation, and/or to the treatment step 2. After the dewatering 14, the primary fines, having a consistency of about 4%, are further dewatered, e.g. in a screw press 16, to about 30%, whereafter the primary fines are led to heat recovery or for other use.

EXAMPLE

Fractionation of CTMP Pulp

Figure 2:
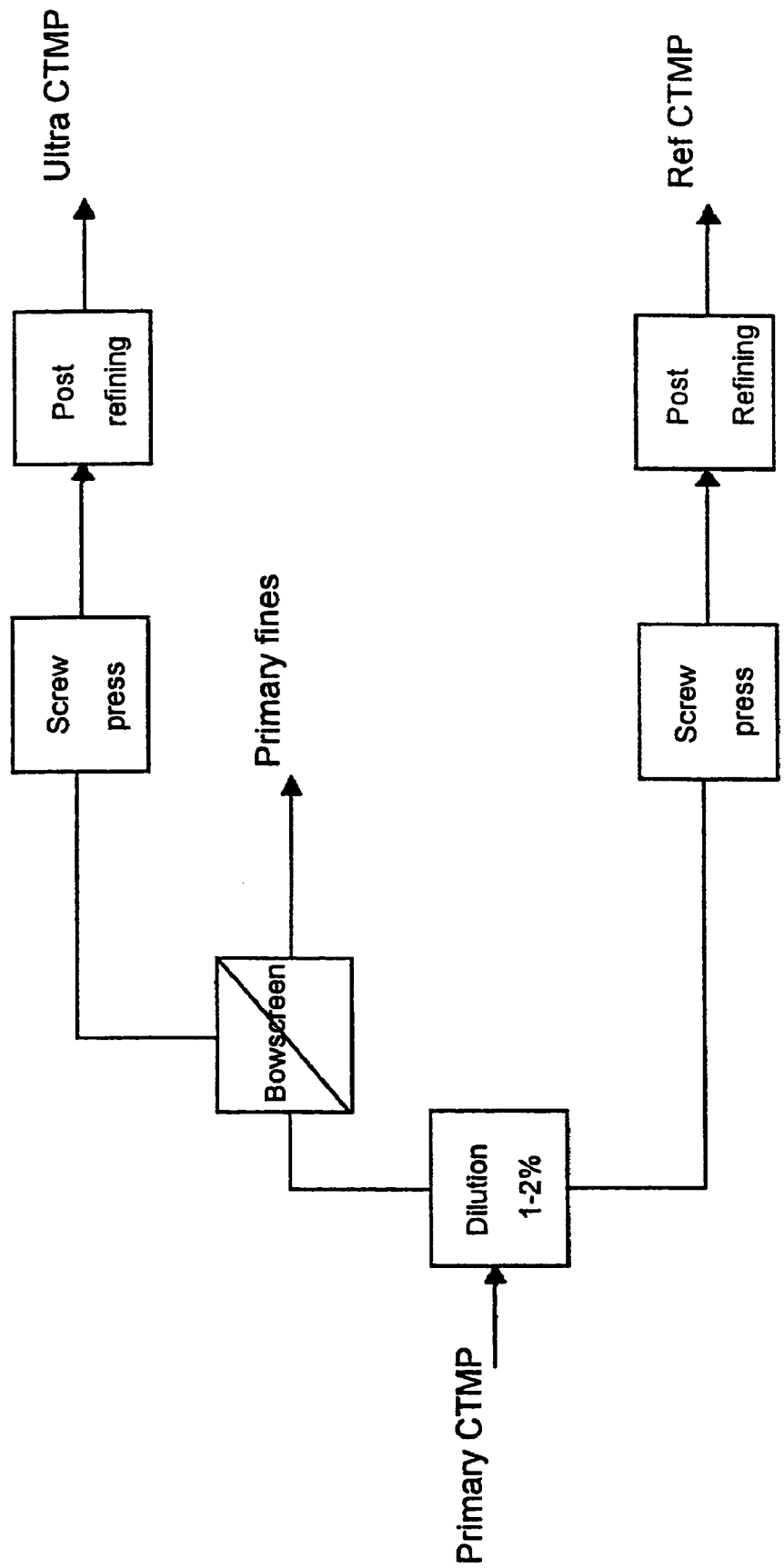
FIG. 2 is showing a flow scheme for comparative tests.

Fractionation trials were carried out on CTMP pulp, which had been refined in a first refining step, using a set-up of curved screen with screen slit width 100 μm, at varied pulp consistency, inlet clearance, flow rate and hydraulic pressure (see FIG. 2). The removal of fines varied from 4.8% to 8.5%, as shown in Table 1. Pulp BSK 4, being the reject from the curved screen, with the highest fines removal was chosen for further studies.

TABLE 1

Curved screen fractionation

| | Bowscreen setting | | Process parameters | | | Fines |
|---|---|---|---|---|---|---|
| | Slit width um | Clearance mm | Flow l/min | Pressure kPa | Consistency % | removal % |
| BSK 1 | 100 | 3 | 1350 | 100 | 2.0 | 4.8 |
| BSK 2 | 100 | 3 | 1890 | 200 | 2.0 | 5.9 |
| BSK 3 | 100 | 2 | 900 | 100 | 1.1 | 7.8 |
| BSK 4 | 100 | 2 | 1260 | 200 | 1.1 | 8.5 |

TABLE 2

Bauer McNett fractionation of CTMP pulp

| | Bauer McNett Fractionation | | | | | Whole Pulp | |
|---|---|---|---|---|---|---|---|
| | >16 mesh % | >30 % | >100 % | >200 % | <200 % | Mn ppm | Freeness CSF |
| Primary | 49.2 | 18.5 | 13 | 3.9 | 12.0 | 25 | 590 |
| BSK 4 | 53.6 | 19.8 | 14 | 4.1 | 8.2 | 13 | 650 |
| Reference | 47.9 | 19.9 | 14 | 4.3 | 13.5 | 18 | 390 |
| Ultra-CTMP | 47.6 | 20 | 15 | 4.1 | 13.3 | 11 | 390 |

When comparing the incoming pulp (Primary), with the fractionated pulp (BSK 4), the long fibre fraction (>16 mesh) has increased from 49.2% to 53.6%, due to the fractionation. This in combination with a decreased fines content, from 12% to 8.2%, resulted in an increase in freeness, from 590 ml to 650 ml (see Table 2).

Post-Refining of Fractionated CTMP

According to FIG. 2, the fractionated pulp and a reference pulp were refined in a second refining step, in order to study the strength development Here, "Ultra CTMP" refers to the BSK 4 pulp, after dewatering and post refining (i.e. second refining step) and "Reference" refers to the Primary pulp, after dilution, dewatering and post refining. The trial was done with a 20 inch atmospheric refiner. The refining conditions were: refining consistency 21% (for the reference pulp) and 24% (for the fractionated); disc clearance 0.7–2.0 mm; rotational speed 1500 rpm and production rate about 60 kg/h.

Figure 3:
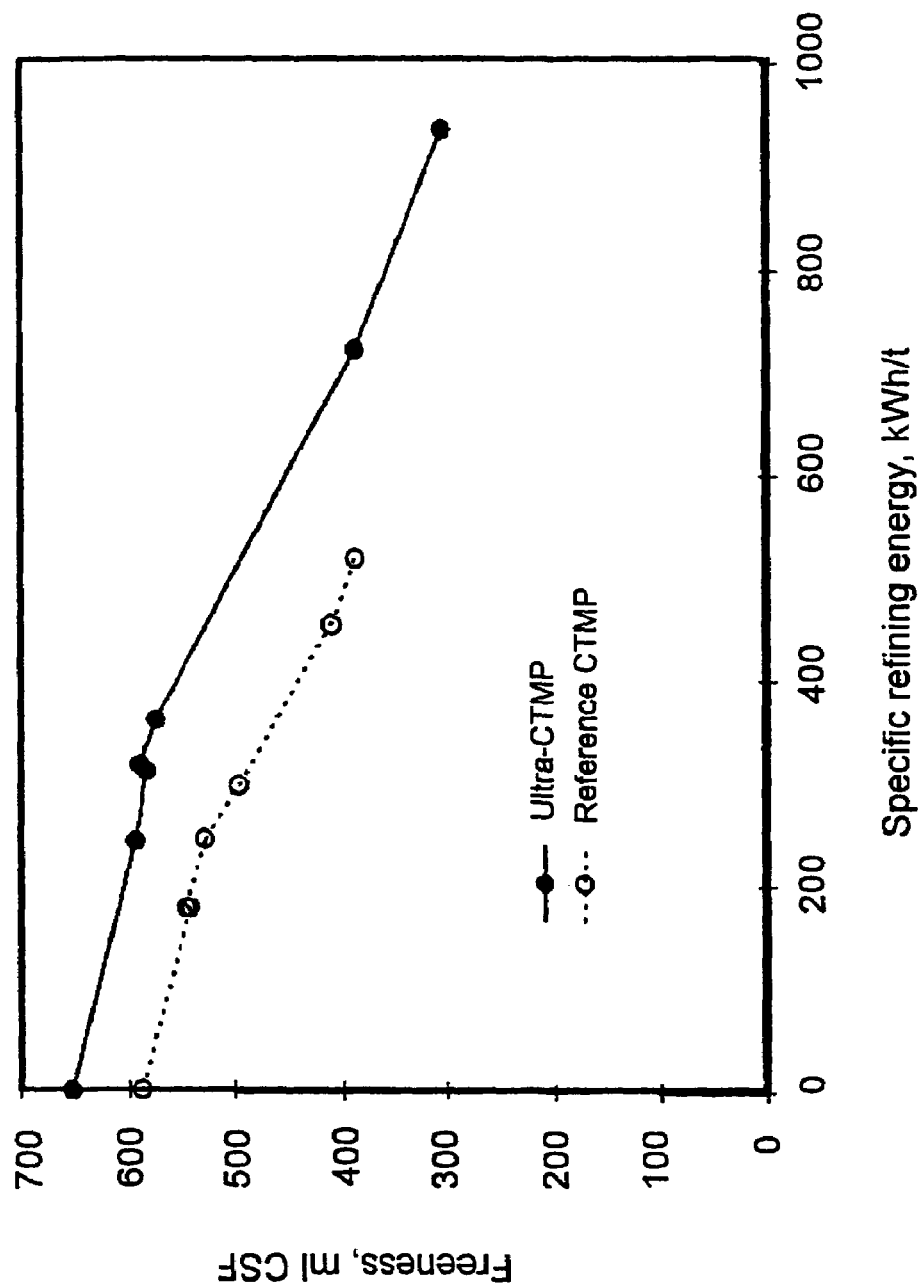
FIG. 3 is a diagram showing freeness vs. refining energy for a post refined pulp according to the invention and a reference pulp.

As shown in FIG. 3, freeness of both pulps decreased in a similar pattern with refining energy. The fractionated, post refined pulp (Ultra-CTMP) required about 200 kWh/t more energy to reach the same freeness level, due to the loss of primary fines during the fractionation. Interestingly, both Ultra-CTMP and the reference pulp (Reference) have very much the same Bauer McNett profile after the second refining step, regarding both long fiber and fines content (see Table 2).

Pulp Properties

Physical Properties

The physical properties of the Ultra CTMP and the Reference were tested on 150 g/m$^2$ sheets in order to have a good retention of fines (no white water circulation in sheet-forming).

Figure 4:
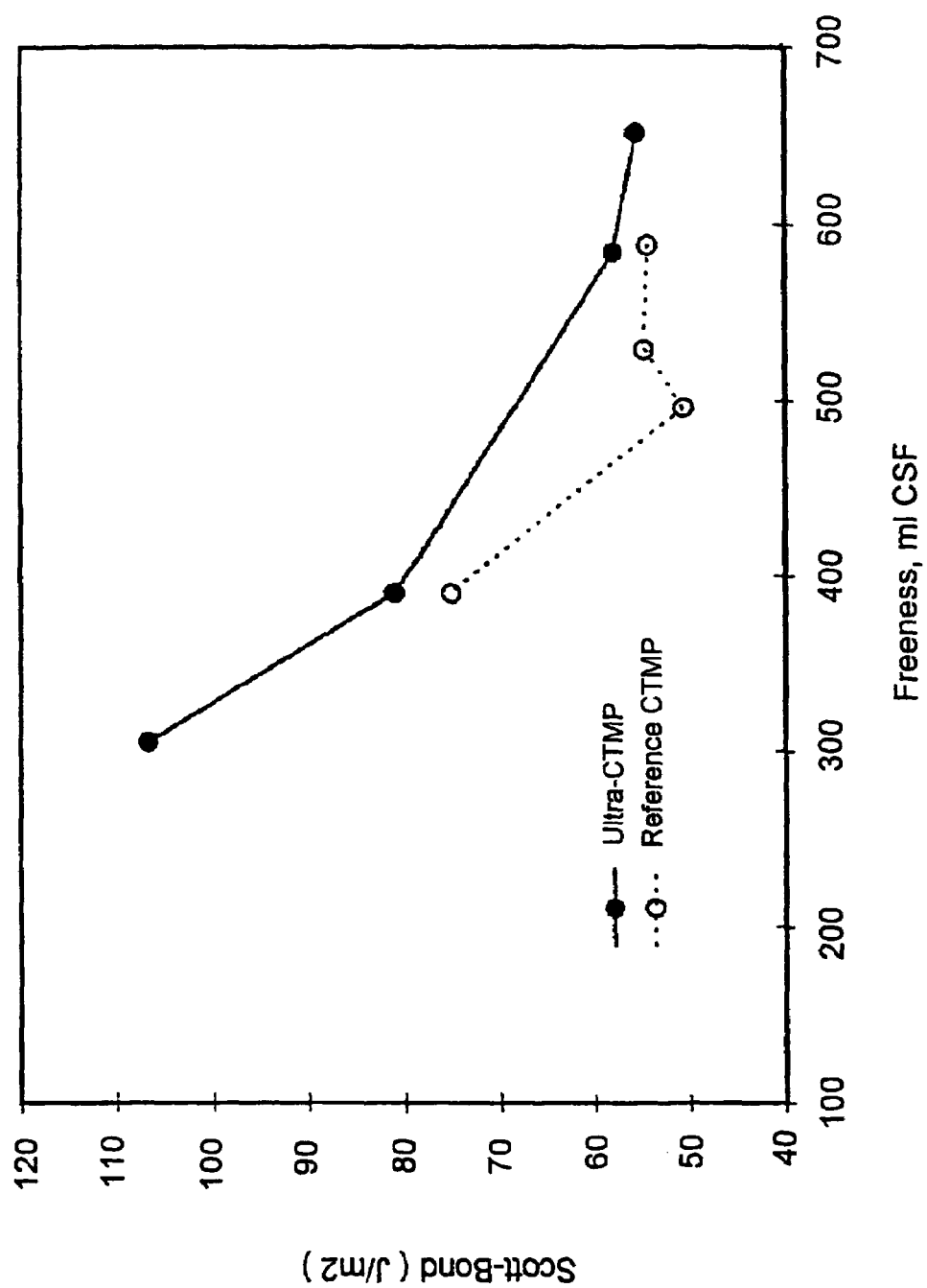
FIG. 4 is a diagram showing Scott Bond vs. freeness for the pulps of FIG. 3.

When compared at standard pressing conditions (400 kPa) the Ultra-CTMP had comparably higher Scott bond at given freeness, see FIG. 4. Regarding other physical properties, such as tensile strength and tensile stiffness index, there were no significant differences when comparing at equal freeness.

What is more interesting, however, is the strength-density relationship of the resulting pulp. In order to further evaluate this, sheets were made with different wet pressing pressure and tested for the pulps both before and after post refining to 390 ml CSF (which is the approximate freeness level for centre layer CTMP).

Figure 5:
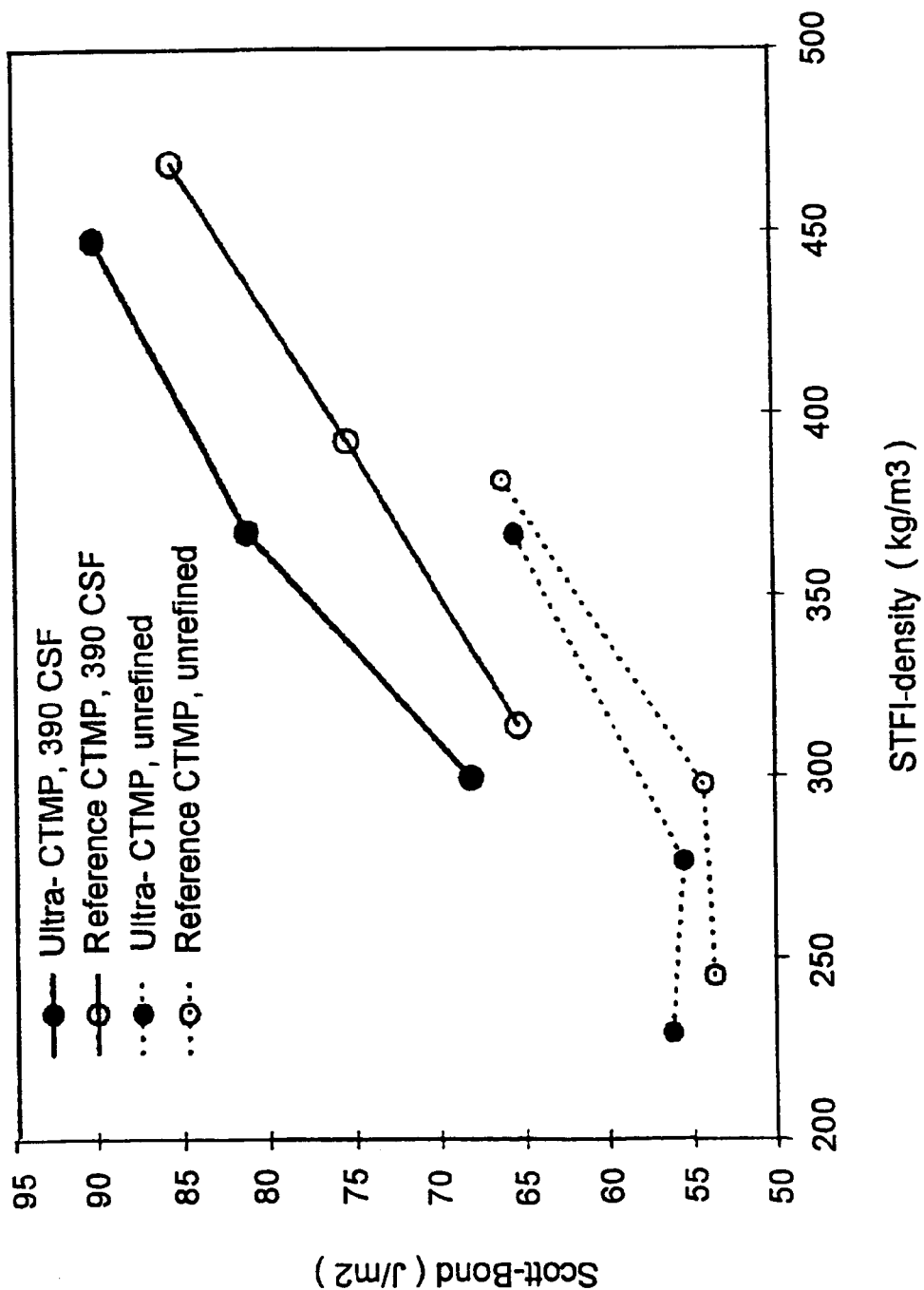
FIG. 5 is a diagram showing Scott Bond vs. density for the pulps of FIG. 3, and also for the corresponding pulps before post refining.

The superior Scott bond-density relationship of Ultra-CTMP was maintained at the three different pressure levels, see FIG. 5. Scott bond increased with increased pressing pressure for both pulps, though the Ultra-CTMP appeared to be more resistant toward wet pressing, showing lower sheet density at the same freeness and press pressure. At a Scott bond of 72 J/m$^2$, which is a normal value for CTMP for paperboard production, the density was reduced from approx. 350 kg/m³ to 300 kg/m³, an improvement by 13%.

Figure 6:
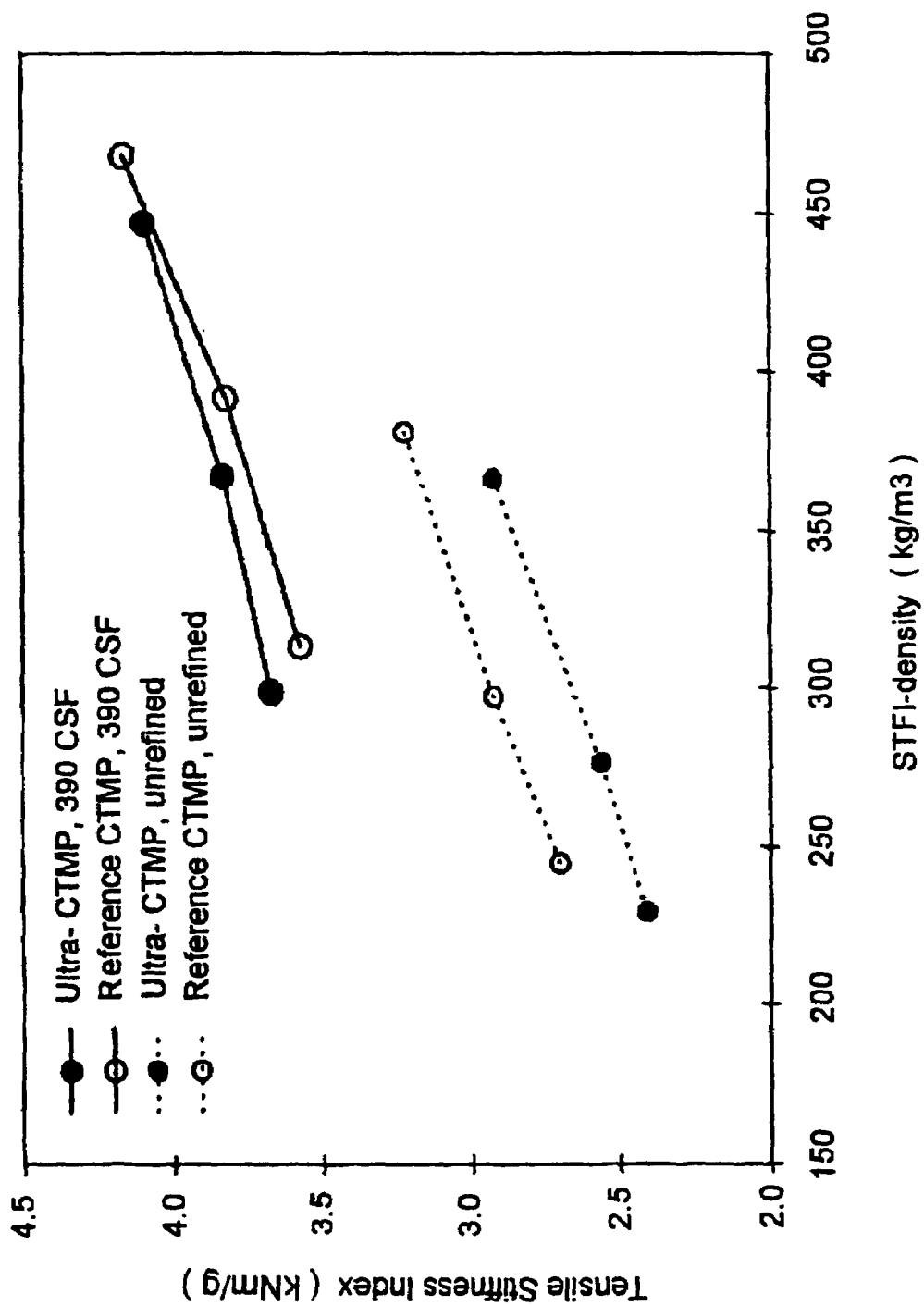
FIG. 6 is a diagram showing tensile stiffness index vs. density for the pulps of FIG. 3, and also for the corresponding pulps before post refining.

FIG. 6 shows that the post refined Ultra-CTMP also had about 13% lower density when compared at tensile stiffness index 3.7 kNm/g, which is a normal value for CTMP for paperboard production. With increased wet pressing pressure the tensile stiffness of the reference got closer to the Ultra CTMP but at this high pressure the bulk loss became more severe.

Before post refining, the fractionated Ultra-CTMP had a poorer tensile stiffness-density relationship, probably because of the higher pulp freeness as a result of the fines removal.

Figure 7:
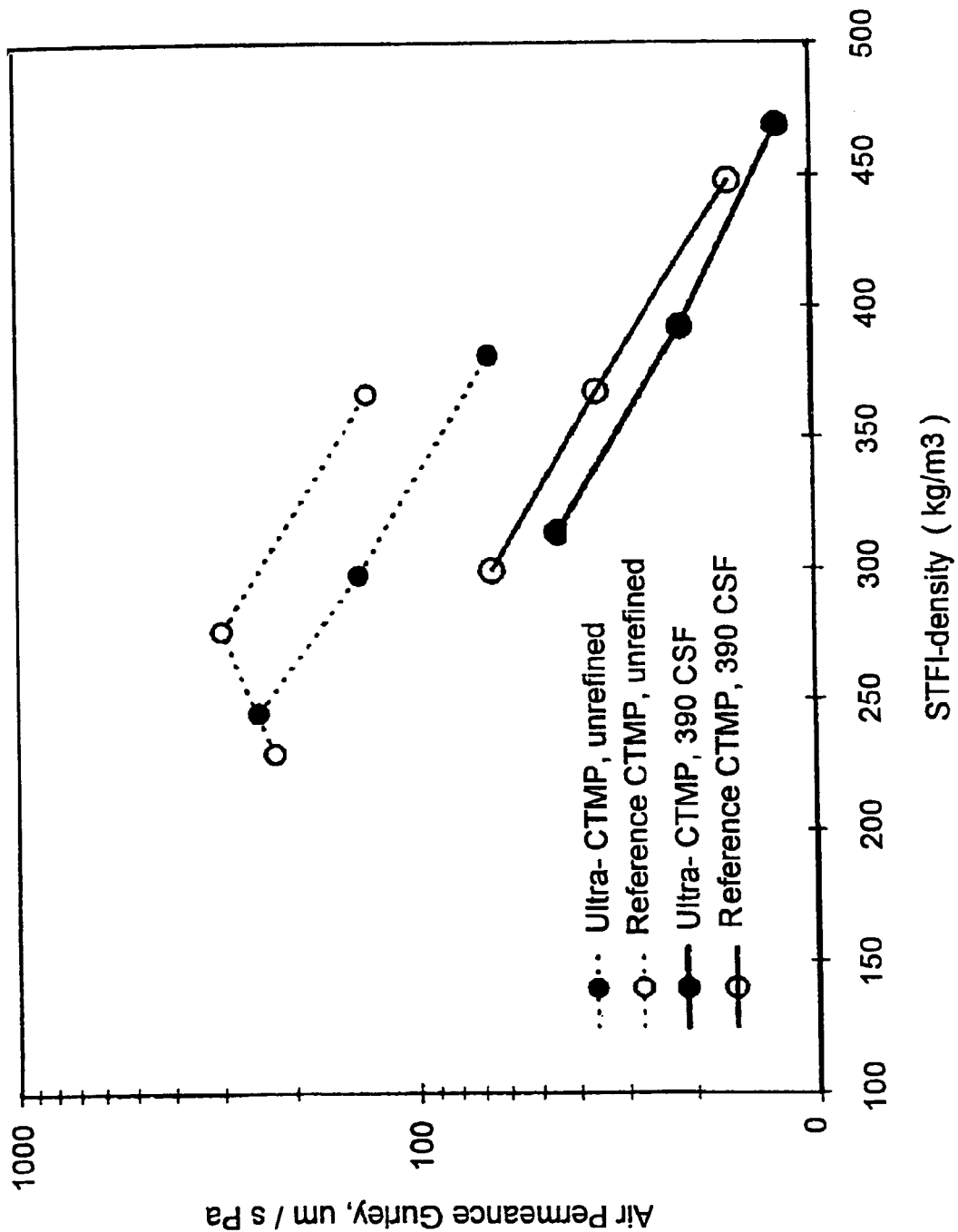
FIG. 7 is a diagram showing air permeance vs. density for the pulps of FIG. 3, and also for the corresponding pulps before post refining.

The air permeance at given density was also higher for the Ultra CTMP than for the reference, both before and after post refining, see FIG. 7.

The physical testing of the post refined pulps clearly showed that the Ultra CTMP had a more open and bulky structure at a given tensile stiffness and Scott bond. The improved properties resulted in an increase in bulk by about 13% at comparable Scott bond and tensile stiffness, from 2.9 (density 350 kg/m³) to 3.3 (density 300 kg/m³). The bulkier structure should give higher bending stiffness and also easier drying on the board machine.

Peroxide Bleaching

The post-refined fractionated pulp, having a freeness of 390 ml, was bleached with peroxide to evaluate the bleachability. In comparison, the reference pulp (Reference), refined to the same freeness, was also bleached.

Figure 8:
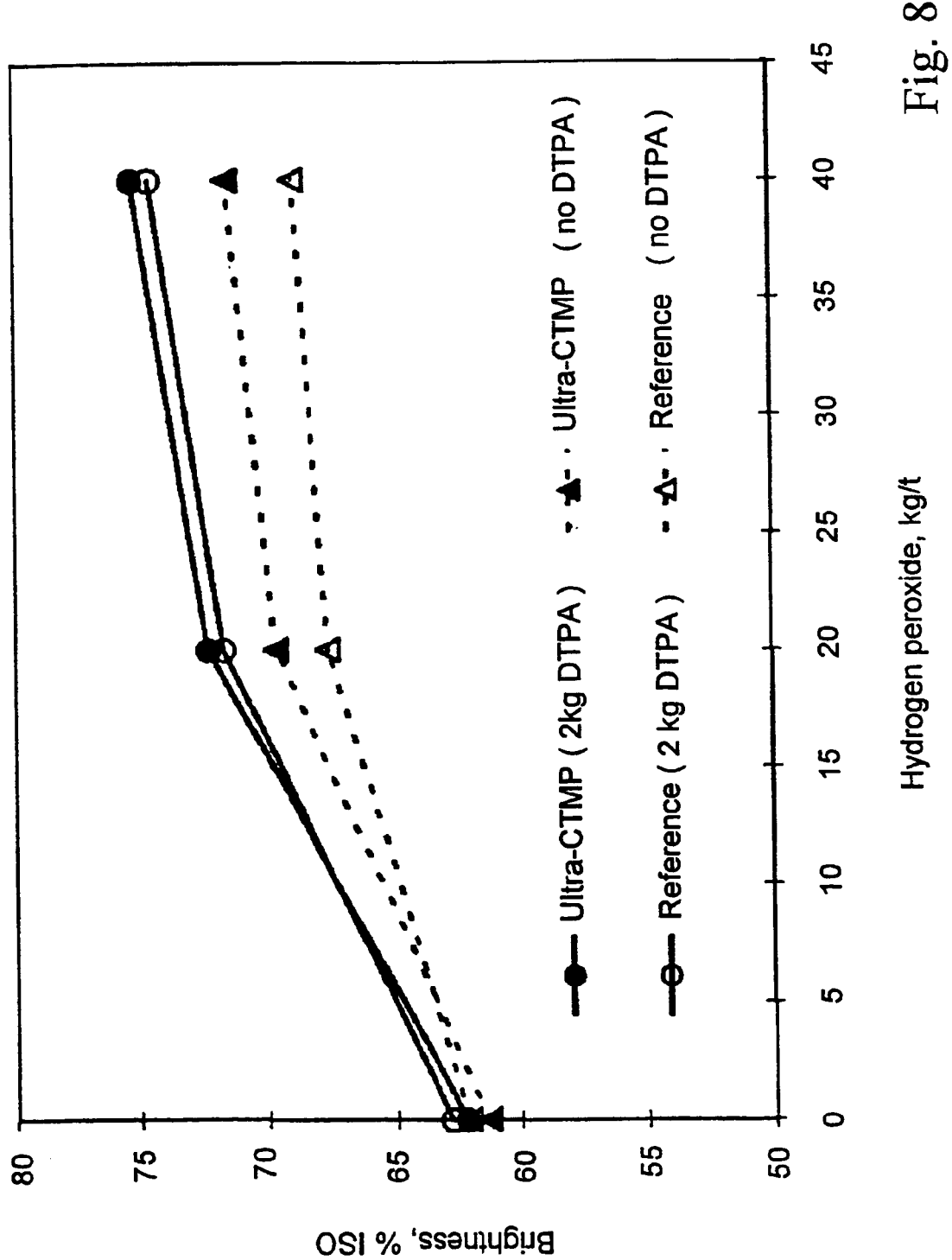
FIG. 8 is a diagram showing brightness vs. peroxide charge, with and without charge of chelating agent, for the pulps of FIG. 3.

As shown in FIG. 8, the bleaching response was better for Ultra CTMP at all peroxide levels. The difference was less significant without DTPA addition in the bleaching. This is likely explained by the higher manganese content in the reference pulp, 18 ppm compared to 11 ppm in Ultra-CTMP (Table 2). With DTPA addition in bleaching the bleaching response was improved for both pulps and the difference in bleaching response of the pulps was also reduced.

Taint and Odour Properties in Relation to Chemical Composition

The chemical composition of fractionated (Ultra CTMP) and reference (Reference) CTMP pulp was measured using acid hydrolysis followed by sugar analysis. The partial removal of primary fines in curved screen reduced the lignin content in the remaining fines as well as in the whole pulp, Table 3. As secondary fines contained less lignin, the fines after post refining contained less lignin and more cellulose. The difference was much more pronounced for the Ultra CTMP, due to the removal of the lignin-enriched primary fines.

TABLE 3

Chemical composition of CTMP and fines

| | Whole Pulp | | | Fines (<200 mesh) | | |
|---|---|---|---|---|---|---|
| | Glucose % | Tot sugar % | Lignin % | Glucose % | Tot sugar % | Lignin % |
| Ref CTMP (primary) | 46.2 | 67 | 27.00 | 32.8 | 54.3 | 37.9 |
| Fractionated CTMP | 47.1 | 68.4 | 26.20 | 34.3 | 56.8 | 36.5 |
| Ref CTMP (post refined) | | | | 33.3 | 54.8 | 37.7 |
| Ultra CTMP (post refined) | | | | 36.9 | 59.4 | 35.2 |

TABLE 4

Hexanal analysis and extractive content

| | Aceton extract % | Unsaturat. fatty acids mg/g | Unsat. tri-glycerides mg/g | Unsat. steryl esters mg/g | Resin acids mg/g | Mn ppm | Hexanal 10 days | Hexanal 30 days |
|---|---|---|---|---|---|---|---|---|
| Ref CTMP | 0.45 | 0.25 | 1.25 | 0.5 | 0.55 | 18 | 90 | 955 |
| Ultra-CTMP | 0.21 | 0.05 | 0.3 | 0.2 | 0.15 | 11 | 15 | 55 |
| Mill CTMP* | | | | | | | | |
| 2 stage | 0.63 | 0.17 | 2.4 | 0.5 | 0.3 | | | 250 |
| 3 stage | 0.37 | 0.09 | 1.4 | 0.3 | 0.1 | <2 | 12** | 45 |

*Mill CTMP
**6–8 days.

As shown in Table 4, the extractives content (acetone content) in the Ultra CTMP was 50% lower than in the Reference CTMP. The reduction in unsaturated acids/esters was even more radical. The explanation could be that as extractives are generally enriched in materials originated from middle lamella and parenchyma cells surrounding ray cells and resin channels, both represented in primary fines, removal of primary fines naturally results in a decrease in the extractives content. Furthermore, as transition metals, especially manganese, tend to locate also preferentially in the middle lamella and parenchyma cells, removal of primary fines leads to reduction of manganese content. Consequently, the taint and odour properties of pulp, here measured as hexanal value after 10 respectively 30 days, were ca 80–90% lower for the fractionated Ultra-CTMP. Although the pulps compared in this study were not washed as thoroughly as in the mill (FIG. 2), the taint and odour properties of Ultra-CTMP were comparable to those of the fully washed mill CTMP (−3 stage). The large difference between Ultra-CTMP and the reference CTMP deserves special notification, indicating the potential that can be achieved by primary fines removal.

The invention is not limited by the above described embodiment and example, but may be varied within the scope of the claims.

What is claimed is:

1. Method in connection with the production of mechanical pulp from an unbleached cellulose-containing wood or non-wood raw material, comprising:
subjecting said unbleached material to a first refining step to produce primary fines consisting essentially of middle lamella fragments and materials originated from the parenchyma cells and containing lignin and extractives;

subjecting said material to a second refining step to produce strength-contributing secondary fines having about the same size as the primary fines but having a different composition; and fractionating the pulp after said first refining step but before said second refining step, to separate primary fines from the pulp, whereafter said separated primary fines are removed from said production of mechanical pulp.

2. Method according to claim 1, wherein said first refining step is adapted to achieve a high freeness in the pulp of at least 500 ml CSF.

3. Method according to claim 1, wherein said first refining step is adapted to achieve a yield a primary fines content of 3–15% in the pulp.

4. Method according to claim 1, wherein said first refining step is adapted to achieve a high freeness in the pulp of 600–800 ml CSF.

5. Method according to claim 1, wherein said first refining step is adapted to yield a primary fines content of 5–10%, in the pulp.

6. Method according to claim 1, wherein said pulp is subjected to a treatment step after said first refining step, but before said fractionation, in which treatment step the pulp is subjected to dilution, temperature enhancement, mechanical agitation and retention time.

7. Method according to claim 1, wherein said fractionation is performed by screening or by centrifugation.

8. Method according to claim 1, wherein said fractionation is performed in at least one curved screen.

9. Method according to claim 1, wherein said fractionation is performed by centrifugation in at least one cyclone.

10. Method according to claim 1, wherein said fractionation is performed in at least two steps.

11. Method according to claim 1, wherein 3–15% of said pulp, measured as dry weight, is separated from said pulp in said fractionation.

12. Method according to claim 1, wherein 5–10% of said pulp, measured as dry weight, is separated from said pulp in said fractionation.

13. Method according to claim 1, wherein said separated primary fines are used for heat recovery, for cattle food or in another line for pulp, paper or paperboard production.

14. Method according to claim 1, wherein the pulp is subjected to bleaching after the refining and fractionation steps.

15. Method according to claim 14, wherein the pulp is subjected to peroxide bleaching after the refining and fractionation steps.

16. Method according to claim 1, wherein said pulp is CTMP, CMP, TMP or HTCTMP.

17. Method according to claim 1, wherein said produced mechanical pulp is used in the production of paperboard.

18. Method according to claim 1, wherein said produced mechanical pulp is used in the production of paperboard intended for food or liquid related applications.

* * * * *